United States Patent Office

3,330,847
Patented July 11, 1967

3,330,847
STABILIZATION OF ORGANIC ISOCYANATES
James M. Cross, New Martinsville, W. Va., assignor to Mobay Chemical Company, Pittsburgh, Pa., a corporation of Delaware
No Drawing. Filed Oct. 14, 1963, Ser. No. 316,174
3 Claims. (Cl. 260—453)

This invention relates to the stabilization of organic isocyanates and particularly to the stabilization of isocyanates at elevated temperatures.

It has been heretofore known that isocyanates will polymerize with themselves substantially as soon as they are formed by any of the techniques known in art art, such as, by phosgenation of the corresponding organic amines. Various methods of stabilizing the isocyanates to prevent the polymerization are known.

In the production of isocyanates by the commercially known methods and particularly, the phosgenation of amines, high temperatures are sometimes employed either in the conversion of the amines themselves or during purification steps or where distillation is used to recover the desired product. At elevated temperatures and especially about above 90° C. organic isocyanates will react with themselves giving up carbon dioxide and forming carbodiimides. This carbodiimide formation is also accompanied by reaction of the carbodiimides formed with other isocyanate groups or phosgene remaining in the mixture with the formation of uretonimines, chlorformyl-chlorformamidines and probably other secondary impurities. This may result in a low yield of the desired organic diisocyanate and the lowering of the content of NCO groups for reaction in desired chemical reactions.

It is desirable in many instances to react isocyanates with organic compounds containing active hydrogen atoms to prepare urethanes and ureas. It may be desirable to conduct the polyaddition reaction in the liquid phase or melt. Where the particular active hydrogen containing compound employed has a high melting point, it may be necessary to conduct the polyaddition above this melting point. Where such temperatures are employed carbodiimide formation may occur with the release of the carbon dioxide, thus, resulting in undesirable side reaction products and a lower yield of the desired final product. In many instances, where the ratio of NCO groups to active hydrogen atoms is critical, the desired final product will not be achieved because of the loss of NCO groups due to carbodiimide formation.

It is therefore an object of this invention to stabilize organic isocyanates. It is another object of this invention to stabilize organic isocyanates at elevated temperatures. It is still another object of this invention to stabilize organic isocyanates against carbodiimide formation at elevated temperatures. It is a further object of this invention to prevent the decrease in the percent of NCO groups of an organic isocyanate. It is still a further object of this invention to prevent the formation of certain side reaction products when utilizing an organic isocyanate at elevated temperatures. It is still another object of this invention to improve the yield in the procedures for the preparation and recovery of organic isocyanates.

The foregoing objects and others which will become apparent from the following description are accomplished in accordance with the invention generally speaking by providing stabilized organic isocyanates by maintaining the isocyanates when heated to a temperature of at least about 90° C. in a carbon dioxide environment. Thus, the invention contemplates a method of stabilizing organic isocyanates to prevent the reduction in the percentage of NCO groups present in the isocyanate by maintaining the isocyanate in a carbon dioxide environment whenever the temperature exceeds about 90° C. However, where temperatures above 90° C. are required because of either the method of recovery, the use to which the isocyanate is to be put or for any other reason, a marked reduction in the NCO content with the liberation of carbon dioxide is observed. Thus, for example, when an isomeric mixture of 80% 2,4- and 20% 2,6-tolylene diisocyanate is heated for about 34 hours at a temperature range from 164° C. to 230° C. about 34 grams of carbon dioxide are evolved. This indicates the formation of carbodiimide groups and the reduction of the NCO content of the isomer mixture. Upon infra-red analysis the presence of carbodiimide groups is observed. Wet analysis indicates the presence of 6.3% by weight carbodiimide. As it requires two NCO groups for the preparation of 1 carbodiimide group it can readily be determined that the loss in the NCO content equals $2NCO/NCN$ $(6.3) = 84/40$ $(6.3)$ equals 13.2% by weight.

The method of stabilizing organic isocyanates in accordance with this invention is applicable whenever the temperature exceeds about 90° C. as carbon dioxide formation has not been observed to take place below this temperature and the incorporation of a carbon dioxide environment does not significantly enhance the stability of the isocyanate below this temperature. However, above this temperature and preferably above 150° C. the stability of organic isocyanates is greatly improved by the presence of a carbon dioxide environment. Of course, the temperature should never exceed the decomposition temperature of the particular isocyanate.

Any suitable organic isocyanate can be stabilized against the formation of carbodiimide by a carbon dioxide environment such as, for example, aliphatic, cycloaliphatic, aromatic and heterocyclic, mono- di- or higher functional isocyanates such as, for example, hexyl isocyanate, octyl isocyanate, dodecyl isocyanate, octadecyl isocyanate, ethylene diisocynate, propylene diisocyanate, tetramethylene diisocyanate, pentamethylene diisocyanate, octamethylene diisocyanate, undecamethylene diisocyanate, dodecamethylene diisocyanate, 3,3'-diisocyanato dipropylether, etc.; cyclohexyl isocyanate, tetrahydro-alpha-naphthyl isocyanate, tetrahydrobeta-naphthyl isocyanate, etc.; cyclopentylene-1,3-diisocyanate, cyclohexylene-1,4-diisocyanate, toluene isocyanate, p-ethylphenyl isocyanate, 2,4-toluylene diisocyanate, 2,6-toluylene diisocyanate and mixtures of 2,4- and 2,6-toluylene diisocyanate, xylylene-1,4-diisocyanate, xylylene-1,3-diisocyanate, 4,4'-diphenylmethane diisocyanate, 4,4'-diphenyl propane diisocyanate, etc.; benzyl isocyanate, phenylethyl isocyanate, p-isocyanato benzyl isocyanate, etc.; phenyl isocyanate, chlorophenyl isocyanate, p-cetylphenyl isocyanate, p-dodecylphenyl isocyanate, 4-dodecyl-2-methyl-phenyl isocyanate, 3-nitro-4-dodecyl phenyl isocyanate, p-cetyloxphenyl isocyanate, m-phenylene diisocyanate, p-phenylene diisocyanate, naphthylene-1,4-diisocyanate, naphthylene-1,5-diisocyanate, 1,2,4-benzene triisocyanate, etc.; furfuryl isocyanate, tetrahydrofurfuryl isocyanate, furfurylidene diisocyanate, etc,; p,p',p"-triphenyl methane triisocyanate, diphenyl 4,6,4'-triisocyanate and the like.

Of course, NCO terminated reaction products of an excess of any of the above-mentioned isocyanates, with compounds containing active hydrogen atoms, which are reactive with NCO groups such as, for example, water hydrazine, $H_2S$, polyhydric alcohols, such as, ethylene glycol, propylene glycol, butylene glycol, 2,3-butanediol, pentanediol, hexanediol, xylene diol, thiodiglycol, trimethylolethane, trimethylolpropane, pentaterythritol, glycerine, sorbitol and the like; organopolyamines, such as, ethylene diamine, propylene diamine, butylene diamine, tolylene diamine, 4,4'-diamino diphenylmethane, phenylene diamine and the like; carboxylic acids such as, glutaric acid, adipic acid, succinic acid, methyladipic acid, benzene tricarboxylic acid, phthalic acid, terephthalic acid and the like; polymers having active hydrogen atoms such as polyesters, prepared by reacting polyhydric alcohols with polycarboxylic acids, such as any of those mentioned above; polyethers such as those prepared by condensing alkylene oxides, such as, for example, ethylene oxide, propylene oxide, butylene oxide, styrene oxide and the like, with itself, other alkylene oxides, water, hydrazine or any of the polyhydric alcohols and polyamines mentioned above; polythioethers prepared by reacting any of the above-mentioned alkylene oxides with thiodiglycol and the like; polyacetals prepared by reacting any of the above-mentioned polyhydric alcohols with an aldehyde such as, for example, formaldehyde, acetaldehyde and the like. Of course, the term "polyester" includes polyester amides prepared by including any of the above named amines in the preparation of a polyester.

As pointed out above, organic isocyanates are valuable intermediates in the preparation of many different and varied types of products including, pesticides, nematocides, herbicides and also in the preparation of valuable plastic products and particularly polyurethanes wherein the isocyanate is reacted with active hydrogen compounds by techniques widely known.

The invention is further illustrated but not limited by the following examples in which parts are by weight unless otherwise specified.

EXAMPLE 1

About 400 parts by volume of an isomeric mixture of 80% 2,4- and 20% 2,6-tolylene diisocyanate is measured into each of two one-liter 3-necked reaction flasks each of which is equipped with a thermometer. A stream of nitrogen is passed through one of the flasks and upon its removal from the flask into a carbon dioxide absorbent. The other flask is maintained under a pressure of 20 mm. of Hg of carbon dioxide. Each flask is heated at 185° C. for 4 hours and then at 220° C. for an additional 5 hours. At the end of the initial 4-hour heating point about 2.5 parts of carbon dioxide is evolved from the flask into which nitrogen is passed while no indication of carbon dioxide formation is observed in the other flask. After the additional 5-hour heating point at 220° C. a total of 3.2 parts of carbon dioxide is evolved from the flask into which nitrogen is passed with no indication of carbon dioxide production from the flask containing the carbon dioxide under pressure. The evolution of carbon dioxide from the reaction flask containing nitrogen indicates the formulation of carbodiimide groups by reaction of the NCO groups of the isocyanate.

EXAMPLE 2

The procedure of Example 1 is repeated utilizing 400 parts of phenylisocyanate and heating each flask to a temperature of between 161° C. and 164° C. for 55 hours. At the end of this time, 5.6 parts of carbon dioxide are evolved from the flask into which nitrogen is passed while the other flask containing the carbon dioxide part does not indicate any evolution of carbon dioxide. Upon infra-red analysis the presence of carbodiimides is found in the isocyanate into which nitrogen is passed while no indication of carbodiimide formation is observed from the other flask.

EXAMPLE 3

A sample of 4,4'-diphenylmethane diisocyanate is heated for about 33 hours with a continuous stream of nitrogen being passed through the liquid. At the end of this time, 10.3 parts of carbon dioxide has been evolved indicating the formation of carbodiimide. Analysis indicates 1.3% of carbodiimide present in the sample. When the same procedure is conducted passing through carbon dioxide in place of nitrogen no carbodiimide formation can be observed.

It is of course to be understood that the invention is applicable to all organic isocyanates and that any of those heretofore mentioned can be substituted into the examples for the particular isocyanates utilized therein. The invention broadly contemplates all the isocyanates and the stabilization thereof.

Although the invention has been described in considerable detail for the purpose of illustration, it is to be understood that variations can be made by those skilled in the art without departing from the spirit of the invention and scope of the claims.

What is claimed is:
1. A method of stabilizing organic isocyanates against the formation of carbodiimides at temperatures of at least about 90° C. which comprises maintaining the organic isocyanate in a carbon dioxide environment.
2. A method of stabilizing tolylene diisocyanate at temperatures of at least about 150° C. which comprises maintaining said tolylene diisocyanate in a carbon dioxide environment.
3. A method for stabilizing organic isocyanates against the formation of carbodiimides during distillation of the isocyanate which comprises distilling said organic isocyanate at a temperature of at least 110° C. while maintaining the organic isocyanate during and after said distillation in a carbon dioxide environment.

References Cited

UNITED STATES PATENTS 3,247,236    4/1966    Adams _____ 260—453

OTHER REFERENCES

Bailey, Industrial and Engineering Chemistry, 1956, vol. 48, No. 4, pp. 794–797.

Siefken, Justus Liebigs, Annalen der Chemie, 1949, vol. 562, pp. 75—120.

Technical Bulletin C–3, Allied Chemical Corporation, Sept. 29, 1960, p. 3.

CHARLES B. PARKER, *Primary Examiner.*

JOSEPH P. BRUST, *Examiner.*

DALE R. MAHANAND, RICHARD L. RAYMOND,
*Assistant Examiners.*